United States Patent
Kobayashi

(10) Patent No.: US 9,393,852 B2
(45) Date of Patent: Jul. 19, 2016

(54) STABILIZER BAR SUPPORT DEVICE

(71) Applicant: TOYOTA JIDOSHA KABUSHIKI KAISHA, Toyota-shi, Aichi-ken (JP)

(72) Inventor: Masayoshi Kobayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/740,981

(22) Filed: Jun. 16, 2015

(65) Prior Publication Data
US 2016/0001627 A1 Jan. 7, 2016

(30) Foreign Application Priority Data
Jul. 2, 2014 (JP) ................................ 2014-136628

(51) Int. Cl.
*F16M 13/00* (2006.01)
*B60G 21/055* (2006.01)

(52) U.S. Cl.
CPC ...... *B60G 21/0551* (2013.01); *B60G 2202/135* (2013.01); *B60G 2204/1222* (2013.01); *B60G 2204/41* (2013.01); *B60G 2204/4307* (2013.01); *B60G 2206/013* (2013.01)

(58) Field of Classification Search
CPC ..................... B60G 21/0551; B60G 2202/135; B60G 2204/1222; B60G 2204/41; F16F 15/08
USPC .......... 248/580, 608, 609; 267/140.12, 141.1, 267/141.3, 276; 280/124.13, 124.144, 280/124.149, 124.152
See application file for complete search history.

(56) References Cited

U.S. PATENT DOCUMENTS

| | | | | |
|---|---|---|---|---|
| 5,290,018 A | * | 3/1994 | Watanabe | B60G 21/0551 267/141.3 |
| 6,241,225 B1 | * | 6/2001 | Krause | B60G 21/0551 267/292 |
| 7,828,308 B2 | * | 11/2010 | Hansson | B60G 21/0551 267/140.12 |
| 8,292,312 B2 | * | 10/2012 | Kato | B60G 21/0551 267/141.1 |
| 8,505,940 B1 | * | 8/2013 | Hufnagle | B60G 21/0551 280/124.13 |
| 2004/0075235 A1 | * | 4/2004 | Cai | B60G 21/0551 280/124.152 |
| 2006/0091595 A1 | * | 5/2006 | Hayashi | B60G 21/0551 267/276 |
| 2009/0200767 A1 | * | 8/2009 | Lim | B60G 21/0551 280/124.152 |

FOREIGN PATENT DOCUMENTS

JP 2013-060196 A 4/2013

* cited by examiner

*Primary Examiner* — Anita M King
(74) *Attorney, Agent, or Firm* — Oliff PLC

(57) ABSTRACT

A stabilizer bar support device for supporting a stabilizer bar on a vehicle-body-member. The device includes a bush having a through hole, wherein the stabilizer bar is inserted; and a bracket, which has a U-shaped body-part for receiving the bush, a first fastened part extending from one end of the body-part, the first fastened part being fastened to the vehicle-body-member; a second fastened part extending from other end of the body-part, the second fastened part being fastened to the vehicle-body-member. The bush compressively deformed by being pressed by the body-part of the bracket toward the vehicle-body-member when the first and second fastened parts are fastened to the vehicle-body-member. An amount of compressive deformation of a center-part of the bush in an axial direction of the through hole is smaller than an amount of compressive deformation of an end-part of the bush in the axial direction of the through hole.

2 Claims, 8 Drawing Sheets

STABILIZER BAR SUPPORT DEVICE

BACKGROUND ART

1. Field of the Invention

The invention relates to a stabilizer bar support device for supporting a stabilizer bar on a vehicle body.

2. Description of Related Art

Conventionally, a stabilizer is known as a device for reducing a roll angle of a vehicle body. The stabilizer includes a rod body which extends between right and left wheels. The stabilizer has a stabilizer bar and arms. The stabilizer bar is positioned along a lateral direction of a vehicle and is mounted on the vehicle body. The respective arms are bent from respective opposite ends of the stabilizer bar and extend along a longitudinal direction of the vehicle. The tip ends of the arms are connected to unsprung members of lower arms or the like of suspensions, respectively. The stabilizer bar is twisted by relative displacements of the right and left arms thereof to generate reaction torsion force which reduces the roll angle when the right and left wheels stroke in an inverse phase such as during cornering travelling of the vehicle.

In general, the stabilizer is supported on the vehicle body by brackets via bushes at right and left ends of the stabilizer bar, respectively, as described in Unexamined Japanese Patent Publication No. 2013-60196. Each of the brackets has a U-shaped band part and fastened plate parts. The fastened plate parts are connected integrally to the U-shaped band part. The U-shaped band part has a U-shape in an axial direction of the stabilizer bar. Each of the fastened plate parts extends outwardly from the respective ends of the U-shaped band part. Each of the fastened plate parts has a bolt hole. The stabilizer bar is supported on the vehicle body by fitting the cylindrical bush to the outer peripheral surface of the stabilizer bar, fitting the U-shaped band part of the bracket to the outer peripheral surface of the bush and bolt-fastening the fastened plate parts to the vehicle body.

SUMMARY OF THE INVENTION

Load acts on the stabilizer bar about the axis of the stabilizer bar and load acts on the stabilizer bar in the vehicle vertical direction. Thus, as shown in FIG. 8, when one end of the stabilizer bar 200 moves upward and the other end of the stabilizer bar 200 moves downward, the stabilizer bar 200 may be inclined with respect to the bracket 205, viewing from the vehicle longitudinal direction. In this case, a gap O is generated at the end of the bush 210 between the outer peripheral surface of the stabilizer bar 200 and the inner peripheral surface of the bush 210.

Such a gap O will be referred to as opening. The stabilizer bar 200 rotates about the axis of the stabilizer bar 200 while the outer periphery surface of the stabilizer bar 200 slides on the inner peripheral surface of the bush 210. However, if contaminants (such as dirt and sand) enter into the opening O, abnormal noise (stick slip noise) is generated due to the jamming by contaminants when the outer peripheral surface of the stabilizer bar 200 slides on the inner peripheral surface of the bush 210.

To solve such a problem, the stabilizer described in Unexamined Japanese Patent Publication No. 2013-60196 is configured such that adhesive is applied to the outer peripheral surface of the stabilizer bar and the stabilizer bar is fitted to the bush. Thereby, the opening can be prevented from being generated, however, the stabilizer bar may not slide with respect to the bush and thus, the stabilizer may be prevented from rotating about the axis of the stabilizer bar. Thereby, the suspension is unlikely to stroke vertically. Thus, the handling stability of the vehicle and the comfortability of the ride of the vehicle may be decreased.

The invention has been made to solve the aforementioned problem. The object of the invention is to provide a stabilizer bar support device in which the opening is unlikely to be generated and the stabilizer bar can slide with respect to the bush smoothly.

The invention relates to a stabilizer bar support device for resiliently supporting a stabilizer bar of a vehicle on a vehicle body member of the vehicle. The stabilizer bar support device comprises a bush made of elastic material and a bracket made of metal. The bush has a through hole. The stabilizer bar is inserted into the through hole. The bracket has a U-shaped body part and first and second fastened parts.

The U-shaped body part receives the bush. The first fastened part extends from one end of the body part and is fastened to the vehicle body member. The second fastened part extends from the other end of the body part and is fastened to the vehicle body member.

The bush can be compressively deformed by being pressed by the body part of the bracket toward the vehicle body member when the first and second fastened parts are fastened to the vehicle body member.

An amount of compressive deformation of a center part of the bush in an axial direction of the through hole is smaller than an amount of compressive deformation of an end part of the bush in the axial direction of the through hole.

As described above, the stabilizer bar support device according to the invention comprises the bush and the bracket. The bush is made of the elastic material and has the through hole, into which the stabilizer bar is inserted. The stabilizer bar generates torsion reaction force in the stabilizer. The bush is fitted to the stabilizer bar while the inner peripheral surface defining the through hole tightly contacts the outer peripheral surface of the stabilizer bar. As described above, the bracket has the body part having a U-shaped inner peripheral surface and the first and second fastened parts extending from respective ends of the body part. The inner peripheral surface of the body part of the bracket presses the outer peripheral surface of the bush toward the vehicle body member when the fastened parts of the bracket are fastened to the vehicle body member. Thereby, the stabilizer bar is supported resiliently on the vehicle body member.

The bush has a part which abuts against the inner peripheral surface of the body part of the bracket and is pressed toward the vehicle body member by the body part of the bracket. This part of the bush will be referred to as pressed part. The stabilizer bar support device is configured such that an amount of compressive deformation of the pressed part of the bush toward the vehicle body member (an elastic deformation amount with compression) varies along the axial direction of the through hole. That is, the stabilizer bar support device is configured such that the amount of the compressive deformation of the center part of the bush in the axial direction is smaller than the amount of the compressive deformation of the end part of the bush in the axial direction.

Thereby, sliding friction force can be reduced at the center part of the bush between the outer peripheral surface of the stabilizer bar and the inner peripheral surface defining the through hole when the stabilizer bar slides on the inner peripheral surface defining the through hole. Further, the opening can be prevented from being generated by setting the compressive deformation amounts of the end parts of the bush to amounts larger than the compressive deformation amount of the center part of the bush, respectively. Therefore, the compressive deformation amounts of the end parts of the bush can be set such that the openings are prevented from being generated and the compressive deformation amount of the center part of the bush can be set to an amount smaller than the respective compressive deformation amount of the respective end part of the bush. Thus, the sliding friction force can totally be reduced between the outer peripheral surface of the stabilizer bar and the inner peripheral surface defining the through hole. Thereby, the stabilizer bar can slide smoothly with respect to the bush. Thus, the handling stability and comfortability of the ride of the vehicle may be improved. Further, the contaminants may be prevented from entering into the opening.

The center part of the bush to be pressed by the inner peripheral surface of the body part of the bracket may have a valley-like shape recessed toward the vehicle body member. In addition, the end part of the bush to be pressed by the inner peripheral surface of the body part of the bracket may have a mountain-like shape elevated away from the vehicle body member.

The body part of the bracket may have a valley-like part recessed away from the vehicle body member and a mountain-like part elevated toward the vehicle body member.

The valley-like part of the body part of the bracket may be able to press the valley-like part of the bush while tightly contacting the valley-like part of the bush. In addition, the mountain-like part of the body part of the bracket may be able to press the mountain-like part of the bush while tightly contacting the mountain-like part of the bush.

The shape of the part of the bush to be pressed by the inner peripheral surface of the body part of the bracket and the shape of the part of the body part of the bracket which presses the bush may be configured such that the amount of the compressive deformation of the bush gradually increases from the valley-like part of the bush toward the top of the mountain-like part of the bush in the axial direction of the through hole and the amount of the compressive deformation of the bush gradually decreases from the top of the mountain-like part of the bush toward the end part of the bush in the axial direction of the through hole.

According to one aspect of the invention, as described above, the outer peripheral surface of the pressed part of the bush has the valley-like shape recessed radially inwardly at the center part of the bush and the mountain-like shape elevated radially outwardly at the end part of the bush. In addition, the inner peripheral surface of the body part of the bracket has the valley-like shape recessed radially inwardly at the center part of the bracket for pressing the center part of the bush and the mountain-like shape elevated radially outwardly at the end part of the bracket for pressing the end part of the bush. Thereby, when the pressed part of the bush is pressed toward the vehicle body member by the body part of the bracket, the pressed part contacts tightly the inner peripheral surface of the body part of the bracket.

In this stabilizer bar support device, the compressive deformation amount of the pressed part of the bush increases gradually from the deepest valley-like part of the center part of the bush toward the top of the mountain-like part of the end part of the bush and decreases gradually from the top of the mountain-like part of the bush toward the axial end of the bush. In this case, the compressive deformation amount of the pressed part of the bush toward the vehicle body member can be varied depending on the axial position by the difference in the shape between the outer peripheral surface of the non-compressed pressed part of the bush and the inner peripheral surface of the body part of the bracket.

According to one aspect of the invention, the respective mountain-like parts of the respective end parts of the bracket can hold the respective end parts of the bush with the compressive deformations of the respective end parts of the bush and the opening can be appropriately prevented from being generated. Therefore, the compressive deformation amount of the top of the mountain-like part of the bush can be set to an amount for preventing the opening from being generated. In addition, the compressive deformation amount of the bush can be set to an amount gradually decreasing from the top of the mountain-like part of the bush toward the valley-like part of the bush and the axial end part of the bush. Thus, the sliding friction force can be totally reduced between the outer peripheral surface of the stabilizer bar and the inner peripheral surface defining the through hole.

The bracket according to one aspect of the invention is characterized in that the bracket is fastened to the vehicle body member upwardly or downwardly with respect to the vehicle, the bush can be compressively deformed in the vehicle vertical direction and cannot be compressively deformed in the vehicle longitudinal direction.

Loads act on the stabilizer about the axis of the stabilizer and vertically. The bracket according to one aspect of the invention is configured such that the bracket is fastened to the vehicle body member upwardly or downwardly with respect to the vehicle to support the stabilizer bar. Thereby, the bush is pressed in the vehicle vertical direction to resiliently support the stabilizer bar. Therefore, even when large load acts on the stabilizer bar in the vehicle vertical direction, the opening can be prevented from being generated. In addition, no large load acts on the stabilizer bar in the vehicle longitudinal direction and thus, the opening is unlikely to be generated by the vehicle longitudinal direction load. According to one aspect of the invention, the bush is configured such that the bush can be compressively deformed in the vehicle vertical direction and cannot be compressively deformed in the vehicle longitudinal direction. Thereby, the opening can be prevented from being generated and the sliding friction force can be further reduced between the outer peripheral surface of the stabilizer bar and the inner peripheral surface defining the through hole of the bush. In addition, the bracket can be mounted on the bush without compressively deforming the bush and the bracket can be easily mounted on the bush.

Note that in the aforementioned description, symbols with parentheses used in embodiment are provided to the components of the invention corresponding to the components of the embodiment for facilitating the understanding of the invention. However, the components of the invention are not limited to the components of the embodiment defined by the symbols.

DESCRIPTION OF THE PREFERRED EMBODIMENTS

Figure 7:
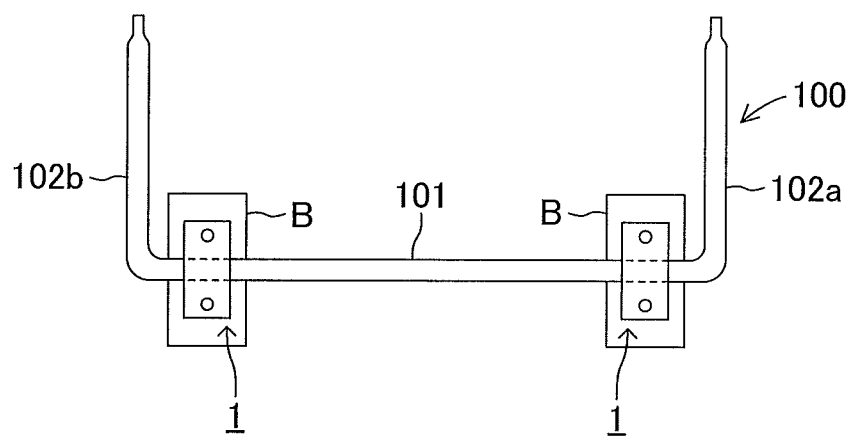
FIG. 7 is a view for describing a relationship in position between the stabilizer and the stabilizer bar support device.
Figure 8:
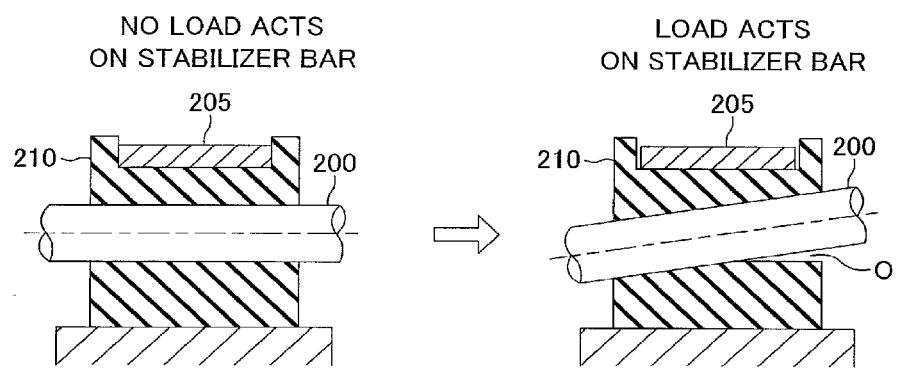
FIG. 8 is a view (a cross sectional view from backside) for describing opening generated in a stabilizer bar support device of the related art.

Below, a stabilizer bar support device according to an embodiment of the invention will be described with reference to the drawings. As shown in FIG. 7, a stabilizer 100 includes a rod-shaped pipe body extending between right and left wheels of a vehicle. The stabilizer 100 comprises a stabilizer bar 101 and arms 102a and 102b. The stabilizer bar 101 is positioned along a vehicle lateral direction. The arm 102a extends from one end of the stabilizer bar 101 in a vehicle longitudinal direction. The arm 102b extends from the other end of the stabilizer bar 101 in the vehicle longitudinal direction. The stabilizer 100 is formed by bending a rod-shaped pipe to include the stabilizer bar 101 and the arms 102a and 102b integral with the stabilizer bar 101. Tip ends of the arms 102a and 102b are connected to unsprung members such as lower arms of right and left suspensions not shown, respectively. The stabilizer bar 101 is twisted by a relative vertical displacement between the right and left arms 102a and 102b to generate torsion reaction force which reduces a roll angle when the right and left wheels stroke in inverse phase such as during cornering travelling of the vehicle.

Figure 1:
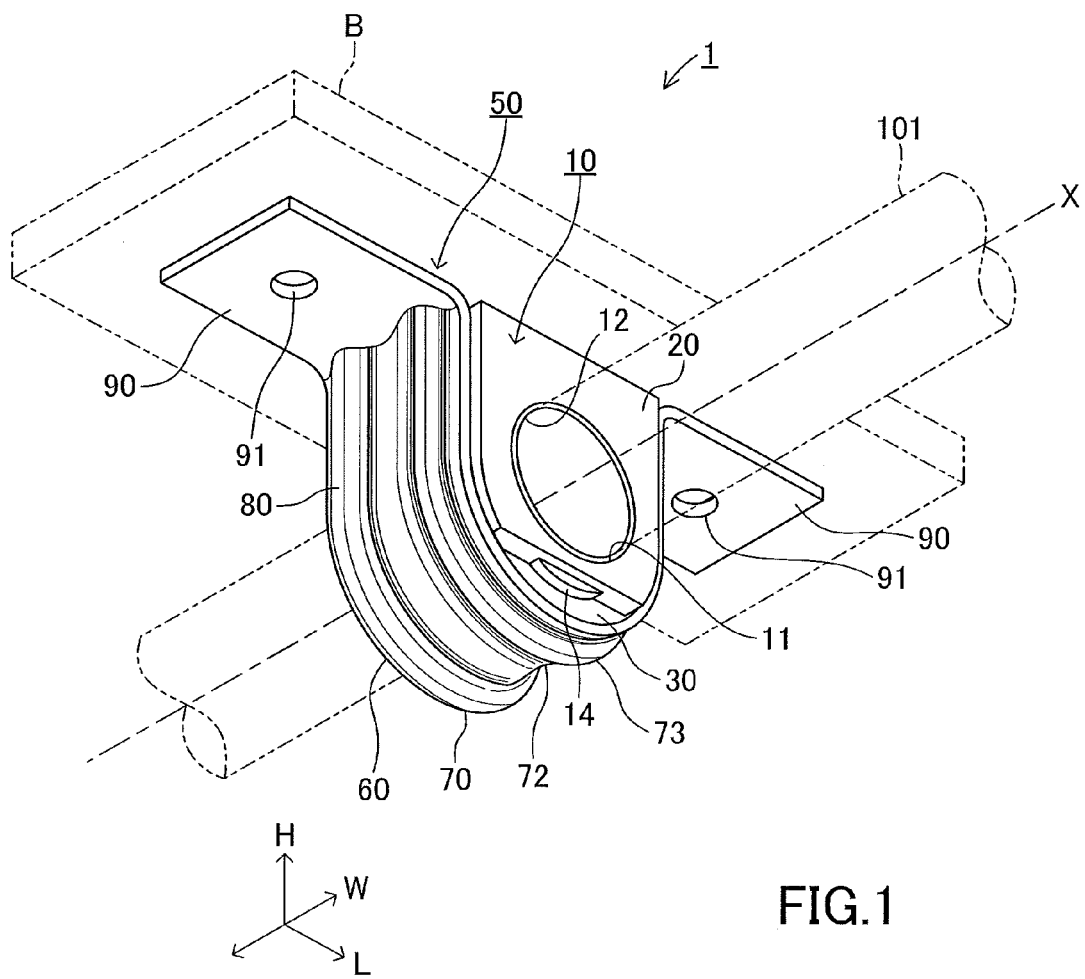
FIG. 1 is a perspective view illustrating a stabilizer bar support device according to an embodiment of the invention from below of the stabilizer bar support device.

The stabilizer bar support devices 1 according to the embodiment resiliently support the stabilizer bars 101 on a vehicle body member B at right and left ends of the stabilizer bar 101, respectively. The stabilizer bar 101 serves as a spring element of the stabilizer 100. As shown in FIG. 1, the stabilizer bar support device 1 comprises a bush 10 and a bracket 50. The bush 10 is fitted in the stabilizer bar 101 while the bush 10 contacts tightly an outer peripheral surface of the stabilizer bar 101. The bracket 50 secures the stabilizer bar 101 on the vehicle body member B via the bush 10.

The bush 10 is made of rubber, i.e. elastic material. A through hole 11 having circlur cross section is provided at center area of the bush 10. The stabilizer bar 101 penetrates (enters into) the through hole 11. Hereinafter, in the description of the stabilizer bar support device 1, an axial direction corresponds to a direction along a center axis X of the through hole 11. In other words, the axial direction corresponds to an axial direction of the stabilizer bar 101. A radial direction corresponds to a direction orthogonal to the axial direction. In other words, the radial direction corresponds to a radial direction of the bush 10 (also, a radial direction of the stabilizer bar 101). A vehicle vertical direction, a vehicle lateral direction and a vehicle longitudinal direction are each defined as directions under the state where the stabilizer bar support device 1 is mounted on the vehicle body member B. Symbol H indicates the vehicle vertical direction in FIGS. 1, 2 and 3. Symbol W indicates the vehicle lateral direction in FIGS. 1, 2 and 3. Symbol L indicates the vehicle longitudinal direction in FIGS. 1, 2 and 3.

The bush 10 includes a base part 20 and a pressed part 30. The base part 20 corresponds to a part of the bush 10 to be secured to the vehicle body member B. On the other hand, the pressed part 30 corresponds to a tip end side part of the bush 10 and corresponds to a part of the bush 10 to be pressed by inner peripheral surface of the bracket 50. The stabilizer bar support device 1 according to the embodiment is positioned such that the base part 20 is located at an upper side of the vehicle and the pressed part 30 is located at a lower side of the vehicle. Therefore, the stabilizer bar support device 1 presses the stabilizer bar 101 in the vehicle vertical direction to support the stabilizer bar 101 on the vehicle body member B. Note that the stabilizer bar support device 1 may be positioned such that the base part 20 is located at the lower side of the vehicle and the pressed part 30 is located at the upper side of the vehicle.

Figure 2:
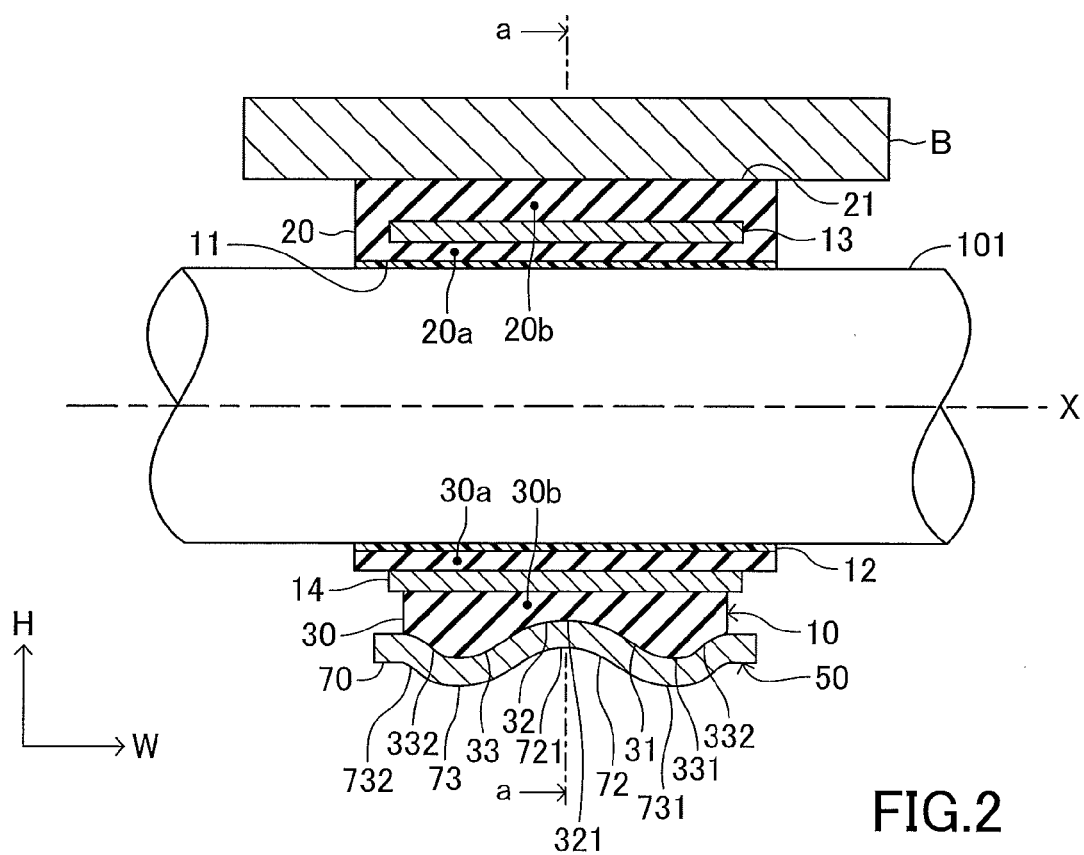
FIG. 2 is a cross sectional view of the stabilizer bar support device according to the embodiment along a vertical plane including a center axis of a through hole.
Figure 3:
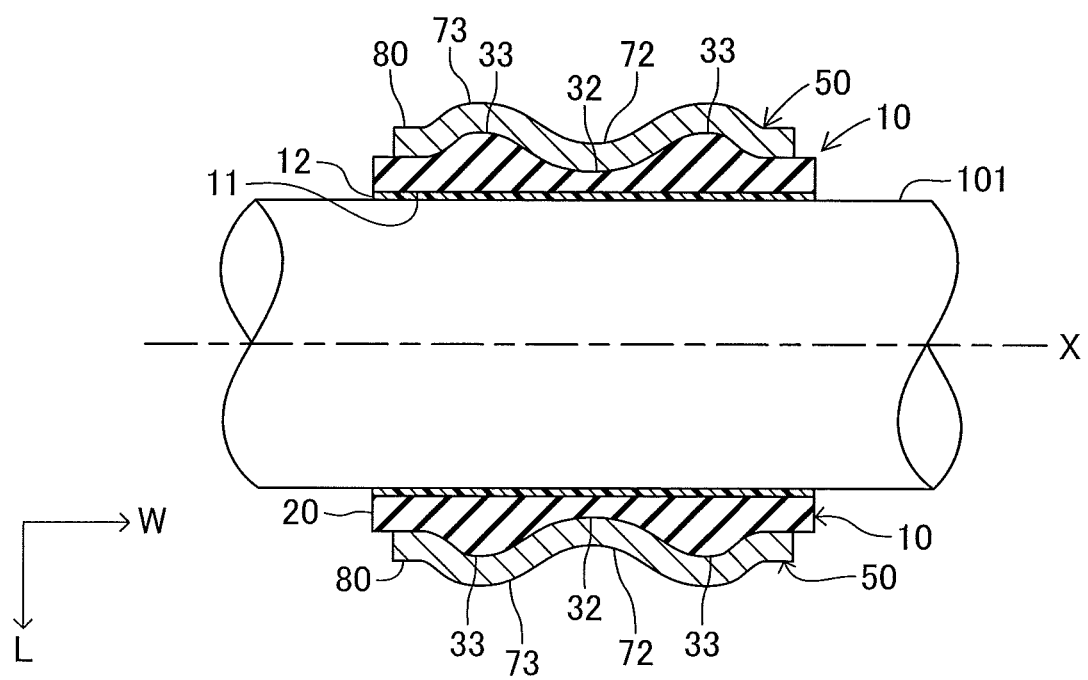
FIG. 3 is a cross sectional view of the stabilizer bar support device according to the embodiment along a horizontal plane including the center axis of the through hole.
Figure 4:
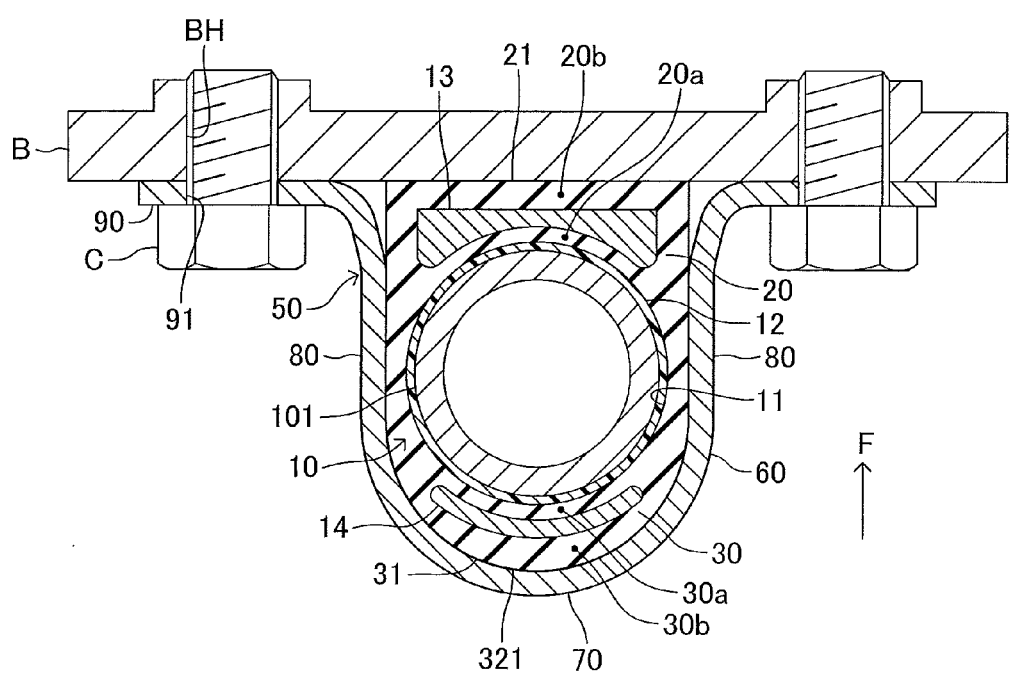
FIG. 4 is a cross sectional view of the stabilizer bar support device according to the embodiment along a plane extending vertically and longitudinally with respect to a vehicle at an axial center position of the stabilizer bar support device.

FIG. 2 is a cross sectional view of the stabilizer bar support device 1 along a vertical plane including the center axis X of the through hole 11 (the center axis of the stabilizer bar 101). Therefore, FIG. 2 shows a longitudinal cross sectional view at the center axis X position of the stabilizer bar support device 1, viewing from the vehicle longitudinal direction. FIG. 3 is a cross sectional view of the stabilizer bar support device 1 along a horizontal plane including the center axis X of the through hole 11. Therefore, FIG. 3 shows a horizontal longitudinal cross sectional view at the center axis X position of the stabilizer bar support device 1, viewing from the vehicle vertical direction. FIG. 4 is a cross sectional view of the stabilizer bar support device 1 at the axial center position of the stabilizer bar support device 1 along the vehicle longitudinal direction. In other words, FIG. 4 is a cross sectional view along a line a-a of FIG. 2. Note that as shown in FIGS. 1 and 2, the axial ends of the pressed part 30 of the bush 10 are cut out, respectively, however, this configuration is necessary for manufacturing the bush 10 and is not a feature of the bush 10.

The base part 20 of the bush 10 has a planar securing surface 21. The surface 21 contacts tightly the vehicle body member B. On the other hand, the pressed part 30 of the bush 10 has outer peripheral surface 31. The surface 31 has arc- and semicircle-shape viewing from the axial direction. This outer peripheral surface 31 is pressed by the inner peripheral surface of the bracket 50 in a direction toward the vehicle body member B (a direction indicated by symbol F in FIG. 4). Hereinafter, this outer peripheral surface 31 will be referred to as—pressed surface 31—.

The bracket 50 is formed integrally of a U-shaped band part 60 and a pair of fastened plate parts 90. The U-shaped band part 60 is formed by bending a band-shaped metal plate to have a U-shape. One of the fastened plate parts 90 extends radially outwardly from one end of the U-shaped band part 60. The other fastened plate part 90 extends radially outwardly from the other end of the U-shaped band part 60. Each of the fastened plate parts 90 has planar surface. The U-shaped band part 60 corresponds to a body part of the bracket according to the invention. The fastened plate parts 90 corresponds to first and second fastened parts of the bracket according to the invention, respectively. The U-shaped band part 60 has a U-shaped band pressing part 70 and parallel plate parts 80. The U-shaped band pressing part 70 has semicircle- and arc-shape viewing from the axial direction. The U-shaped band pressing part 70 serves to press the pressed surface 31 of the bush 10 toward the vehicle body member B. One of the parallel plate parts 80 extends tangentially from one circumferential end of the U-shaped band pressing part 70 and is connected to one of the fastened plate parts 90. The other parallel plate part 80 extends tangentially from the other circumferential end of the U-shaped band pressing part 70 and is connected to the other fastened plate part 90. The parallel plate parts 80 extend parallel with each other. A bolt insert hole 91 is formed in each of the fastened plate parts 90.

The pressed surface 31 of the pressed part 30 of the bush 10 has wave-shaped outer profile along the axial direction. In other words, the radial dimension of the pressed part 30 (the distance from the center axis X of the through hole 11 to the pressed surface 31) continuously changes in the axial direction.

As shown in FIG. 2, the axial center part of the pressed surface 31 of the bush 10 has a valley-like shape recessed radially inwardly. Hereinafter, this valley-like shaped recessed part of the bush 10 will be referred to as—valley-like bush part 32—and the part of the valley-like bush part 32 having a smallest radius will be referred to as—deepest valley-like bush part 321. Each of parts of the pressed part 31 at the either sides of the valley-like bush part 32 in the axial direction has mountain-like shape elevated radially outwardly. Hereinafter, this mountain-like shaped elevated part of the bush 10 will be referred to as—mountain-like bush part 33. A part of the mountain-like bush part 33 having largest radius will be referred to as—mountaintop bush part 331—. There is no boundary between the valley-like and mountain-like bush parts 32 and 33, however, the portion near the mountaintop bush part 331 will be referred to as the mountain-like bush part 33 and the portion near the deepest valley-like bush part 321 will be referred to as the valley-like bush part 32. Each of the mountain-like bush parts 33 has a downwardly inclined part 332. The radius of each of the downwardly inclined parts 332 decreases from the mountaintop-like bush part 331 toward the axial end of the bush 10. The pressed surface 31 at each of the axial ends of the bush 10 is parallel to the center axis X.

The valley-like and mountain-like bush parts 32 and 33 are provided on the pressed surface 31 along the circumferential direction and also are continuously provided straight tangentially from the circumferential ends of the pressed surface 31. In other words, as shown in FIG. 3, the valley-like and mountain-like bush parts 32 and 33 are continuously provided on each of the side surfaces of the base part 20.

A liner cloth 12 is adhered to the inner peripheral surface defining the through hole 11 of the bush 10. The liner cloth 12 serves as a sliding member. The liner cloth 12 may be formed of material having surface lubricity, for example, fluorine resin system cloth material such as TEFLON® (polytetrafluoroethylene). The liner cloth 12 has a cylindrical shape having a constant thickness and a constant radius (a radius which allows the liner cloth 12 to tightly contact the inner peripheral surface defining the through hole 11). The liner cloth 12 covers the entirety of the inner peripheral surface defining the through hole 11. Thus, the rubber material forming the bush 10 does not directly contact the outer peripheral surface of the stabilizer bar 101. Therefore, the friction coefficient is small at a sliding surface between the outer peripheral surface of the stabilizer bar 101 and the inner peripheral surface defining the through hole 11 of the bush 10 provided with the liner cloth 12. Hereinafter, the inner peripheral surface defining the through hole 11 corresponds to inner peripheral surface of the liner cloth 12.

Hereinafter, the inner peripheral surface defining the through hole 11 corresponds to inner peripheral surface of the liner cloth 12.

Further, two partition fittings 13 and 14 (an upper partition fitting 13 and a lower partition fitting 14) are embedded in the bush 10. The upper partition fitting 13 is positioned at upper side of the through hole 11 with respect to the vehicle. The lower partition fitting 14 is positioned at the lower side of the through hole 11 with respect to the vehicle. The upper partition fitting 13 is provided between the through hole 11 (the through hole 11 to which the liner cloth 12 is adhered) and the planar securing surface 21. On the other hand, the lower partition fitting 14 is provided between the through hole 11 and the pressed surface 31. The upper partition fitting 13 is formed of a metal plate. The upper partition fitting 13 has lower surface parallel to the inner peripheral surface defining the through hole 11 which the upper partition fitting 13 faces and upper surface parallel to the planar securing surface 21. The upper partition fitting 13 extends in the axial direction at a position above the inner peripheral surface defining the through hole 11 by a predetermined distance. The lower partition fitting 14 is formed of a metal plate and has arc-shape viewing from the axial direction. The lower partition fitting 14 is provided parallel to the inner peripheral surface defining the through hole 11 which the lower partition fitting 14 faces. The lower partition fitting 14 extends in the axial direction at a position below the inner peripheral surface defining the through hole 11 by a predetermined distance.

As shown in FIGS. 2 and 4, a part of the base part 20 is partitioned by the upper partition fitting 13 to inner and outer areas 20a and 20b. The inner area 20a is between the through hole 11 and the upper partition fitting 13. The outer area 20b is between the upper partition fitting 13 and the planar securing surface 21. In this case, the upper partition fitting 13 is embedded in the base part 20 such that the thickness of the rubber material of the inner area 20a in the radial direction is smaller than the thickness of the rubber material of the outer area 20b in the vertical direction. Similarly, a part of the pressed part 30 is partitioned by the lower partition fitting 14 to inner and outer areas 30a and 30b. The inner area 30a is between the through hole 11 and the lower partition fitting 14. The outer area 30b is between the lower partition fitting 14 and the pressed surface 31. In this case, the lower partition fitting 14 is embedded in the pressed part 30 such that the thickness of the rubber material of the inner area 30a in the radial direction is smaller than the thickness of the rubber material of the outer area 30b in the radial direction.

Similar to the pressed surface 31, the U-shaped band pressing part 70 of the bracket 50 has wave-shape along the axial direction such that the inner peripheral surface of the U-shaped band pressing part 70 can press the pressed surface 31 of the bush 10 while the inner peripheral surface of the U-shaped band pressing part 70 can tightly contact the entirety of the pressed surface 31 of the bush 10. The bracket 50 is formed of a metal plate having a constant thickness. Thus, the shape of the bracket 50 described below is the shape of the outer peripheral surface of the bracket 50 as well as the shape of the inner peripheral surface of the bracket 50. Note that as described later, fastening margin between the U-shaped band pressing part 70 and the pressed part 30 differs depending on the axial position. Thus, when the pressed part 30 is not compressively deformed, the shape of the pressed surface 31 (FIG. 5) is different from the shape of the inner peripheral surface of the U-shaped band pressing part 70.

The axial center part of the U-shaped band pressing part 70 has a valley-like shape recessed radially inwardly. Hereinafter, this valley-like recessed part will be referred to as—valley-like band part 72—and a part of the valley-like band part 72 having a smallest radius (the radius is from the center axis to the U-shaped band pressing part 70) will be referred to as—deepest valley-like band part 721—. Each of parts of the U-shaped band pressing part 70 on the either sides of the valley-like band part 72 has a mountain-like shape elevated radially outwardly. Hereinafter, this mountain-like elevated part will be referred to as mountain-like band part 73. The portion of the mountain-like band part 73 having a largest radius will be referred to as—mountaintop band part 731—. There is no boundary between the valley-like and mountain-like band parts 72 and 73, however, a portion near the mountaintop band part 731 will be referred to as the mountain-like band part 73 and a portion near the deepest valley-like band part 721 will be referred to as the valley-like band part 72. Each of the mountain-like band parts 73 has a downwardly inclined part 732. The radius of each of the downwardly inclined part 732 decreases from the respective mountaintop band part 731 toward the respective axial end of the U-shaped band pressing part 70. Each of the axial ends of the U-shaped band pressing part 70 is parallel to the center axis X.

The valley-like and mountain-like band parts 72 and 73 are formed circumferentially in the U-shaped band pressing part 70 and are also formed continuously straight tangentially from each of the circumferential ends of the U-shaped band pressing part 70. In other words, as shown in FIG. 1, the valley-like and mountain-like band parts 72 and 73 are formed continuously in each of the parallel plate parts 80.

Next, a method for securing the stabilizer 100 to the vehicle body member B will be described. Two pairs of the bush 10 and the bracket 50 are used to secure the stabilizer 100 to the vehicle body member B. The bush 10 is provided with a slit not shown. This slit is formed extending from the through hole 11 radially outwardly. An operator (or an assembly machine) expands the slit and inserts the stabilizer bar 101 of the stabilizer 100 into the through hole 11 from the slit. By eliminating force for expanding the slit, the bush 10 is fitted to the outer peripheral surface of the stabilizer bar 101.

One of the bushes 10 is fitted to the right side of the stabilizer bar 101 at a predetermined position. The other bush 10 is fitted to the left side of the stabilizer bar 101 at a predetermined position. Next, the the one of the bracket 50 is positioned such that the U-shaped opening defined by the one bracket 50 faces the pressed part 30 of the one bush 10. In addition, the other bracket 50 is positioned such that the U-shaped opening defined by the other bracket 50 faces the pressed part 30 of the other bush 10. Next, the one bracket 50 is fitted to the one bush 10 while the inner surfaces of the parallel plate parts 80 of the one bracket 50 slide on the respective side surfaces of the base part 20 of the one bush 10 to allow the one bush 10 to enter into the opening define by the one bracket 50. In addition, the other bracket 50 is fitted to the other bush 10 while the inner surfaces of the parallel plate parts 80 of the other bracket 50 slide on the respective side surfaces of the base part 20 of the other bush 10 to allow the other bush 10 to enter into the opening define by the other bracket 50. There is no fastening margin between the side surface of the base part 20 of the bush 10 and the respective parallel plate part 80 of the bracket 50. Thus, when the respective bracket 50 is pushed onto the respective bush 10, the inner surface of the respective parallel plate part 80 of the bracket 50 can slide on the respective side surface of the base part 20 of the bush 10. Thus, the respective bracket 50 is pushed onto the respective bush 10 until the U-shaped band pressing part 70 of the respective bracket 50 abuts against the pressed surface 31 of the respective bush 10 and the respective bracket 50 is secured temporarily to the respective bush 10.

After the respective bracket 50 is secured temporarily to the respective bush 10, the fastened plate parts 90 of the respective bracket 50 are placed on the vehicle body member B such that the respective bolt insert holes 91 provided in the respective fastened plate parts 90 of the respective bracket 50 is alined with respective screw holes BH provided vertically in the vehicle body member B (see FIG. 4). Then, respective bolt C is inserted into the respective bolt insert hole 91 and is screwed to the respective screw hole BH. Thereby, the respective bracket 50 is fastened to the vehicle body member B by the respective bolt C. Further, the inner peripheral surface defining the through hole 11 tightly contacts the outer peripheral surface of the stabilizer bar 101. Note that the fastening of the bracket 50 to the vehicle body member B is not limited to the fastening by screwing the bolt C and may be a fastening by screwing a nut. For example, the bracket 50 may be fastened to the vehicle body member B by securing stud bolts to the vehicle body member B, inserting the respective stud bolt into the respective bolt insert hole 91 of the respective fastened plate part 90 and screwing a respective nut on the respective stud bolt. Further, for example, the bracket 50 may be fastened by forming bolt insert holes in the vehicle body member B, inserting a respective bolt into the respective insert hole 91 of the respective fastened plate part 90 and the respective bolt insert hole of the vehicle body member B and screwing a respective nut onto the respective bolt.

Next, the fastening margin of the bush 10 will be described. As described above, the bush 10 is compressed by fastening the bracket 50 to the vehicle body member B by screwing the screw. An amount of compression deformation of the bush 10 derived from the compression of the bush 10 by the bracket 50 will be referred to as fastening margin.

Figure 5:
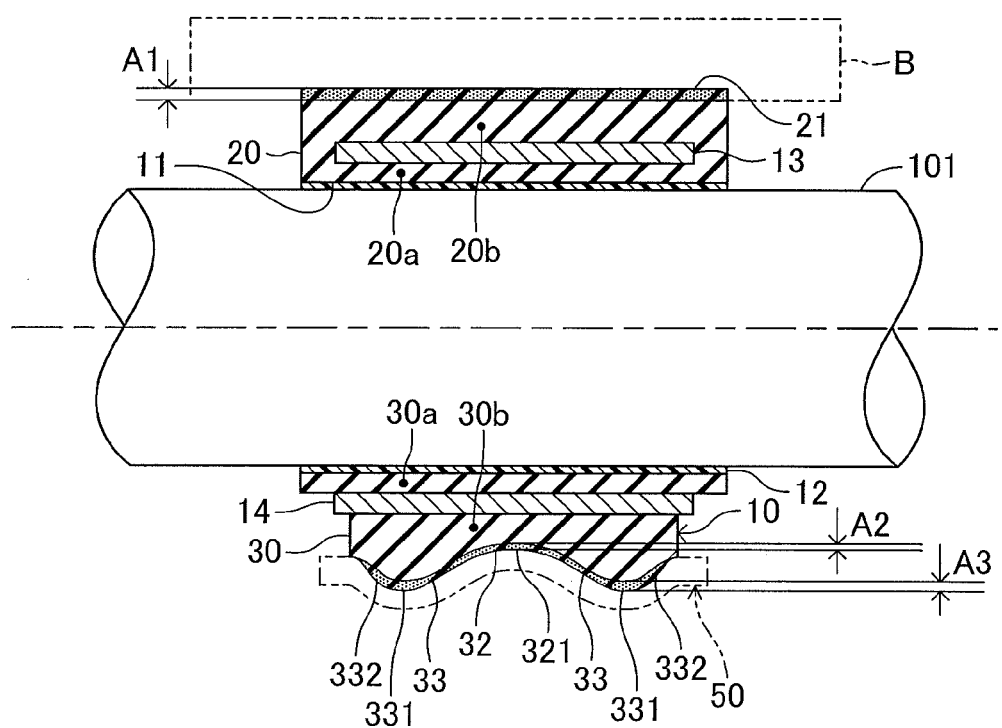
FIG. 5 is a cross sectional view of a bush according to the embodiment along a vertical plane including the center axis of the through hole where the bracket is not mounted and the bush is not compressed and the gray shaded area illustrates a fastening margin.

FIG. 5 shows a cross sectional view of the non-compressed bush 10 similar to FIG. 2 in which the bracket 50 is not installed and the bracket 50 and the vehicle body member B are illustrated by imaginary lines, respectively. In FIG. 5, the fastening margin corresponds to the gray portions, that is, the portions where the bracket 50 illustrated by the imaginary lines overlaps the bush 10 and the vehicle body member B illustrated by the imaginary lines overlaps the bush 10. The bush 10 is compressed by the bracket 50 in the vehicle vertical direction. Thus, the fastening margins are provided on the surfaces on which the loads act in the vehicle vertical direction. The fastening margin A1 which is constant therethroughout is provided between the planar securing surface 21 of the bush 10 and the vehicle body member B.

In addition, the fastening margin of the pressed part 30 of the bush 10 (the fastening margin between the pressed part 30 and the U-shaped band pressing part 70) defers depending on the respective axial position. This fastening margin can be provided by a difference between the wave shape of the pressed surface 31 of the bush 10 (the wave shape formed by the valley-like and mountain-like bush parts 32 and 33) and the wave shape of the inner peripheral surface of the U-shaped band pressing part 70 of the bracket 50 (the wave shape formed by the valley-like and mountain-like band parts 72 and 73). Therefore, the fastening margin of the bush 10 is set by the relationship in the shape between the non-compressed bush 10 and the bracket 50. The fastening margin of the pressed part 30 of the bush 10 shown in FIG. 5 is a fastening margin of a lowest position in the bush 10.

According to the embodiment, the fastening margins of the axial ends of the bush 10 are set to zero, respectively. The fastening margin of the deepest valley-like bush part 321 is set to A2. The fastening margin of the mountaintop bush part 331 is set to A3. The fastening margin A2 of the deepest valley-like bush part 321 is smaller than the fastening margin A3 of the mountaintop bush part 331. The fastening margin of the pressed part 30 of the bush 10 gradually increases from the deepest valley-like bush part 321 toward the mountaintop bush part 331 and gradually decreases at the downwardly inclined part 332 from the mountaintop bush part 331 toward the respective axial ends of the bush 10. Therefore, the fastening margin of the axial center part of the pressed part 30 of the bush 10 is set to a relatively small fastening margin. On the other hand, the fastening margins of the respective axial ends on the either sides of the center part of the pressed part 30 are set to relatively large fastening margins, respectively.

In this case, the fastening margin of the mountaintop bush part 331 can be maximized by setting a height (an outer radius dimension difference) from the deepest valley-like bush part 321 to the mountaintop bush part 331 to a value larger than a height (an inner radius dimension difference) from the deepest valley-like band part 721 to the mountaintop band part 731.

The fastening margin of the pressed part 30 of the bush 10 is maximum at circumferential lowest position of the pressed part 30 of the bush 10 (at tip end of the bush 10) in FIG. 5. The fastening margin of the pressed part 30 of the bush 10 gradually decreases circumferentially outwardly from the lowest position. The fastening margin of the pressed part 30 of the bush 10 is zero at respective circumferential end position of the pressed part 30 (at respective end position of the surface forming an arc of the pressed part 30). Therefore, the fastening margin of the deepest valley-like bush part 321 gradually decreases circumferentially outwardly from the fastening margin A2 of the lowest position of the deepest valley-like bush part 321. Further, the fastening margin of the mountaintop bush part 331 gradually decreases circumferentially outwardly from the fastening margin A3 of the lowest position of the mountaintop bush part 331.

Figure 6:
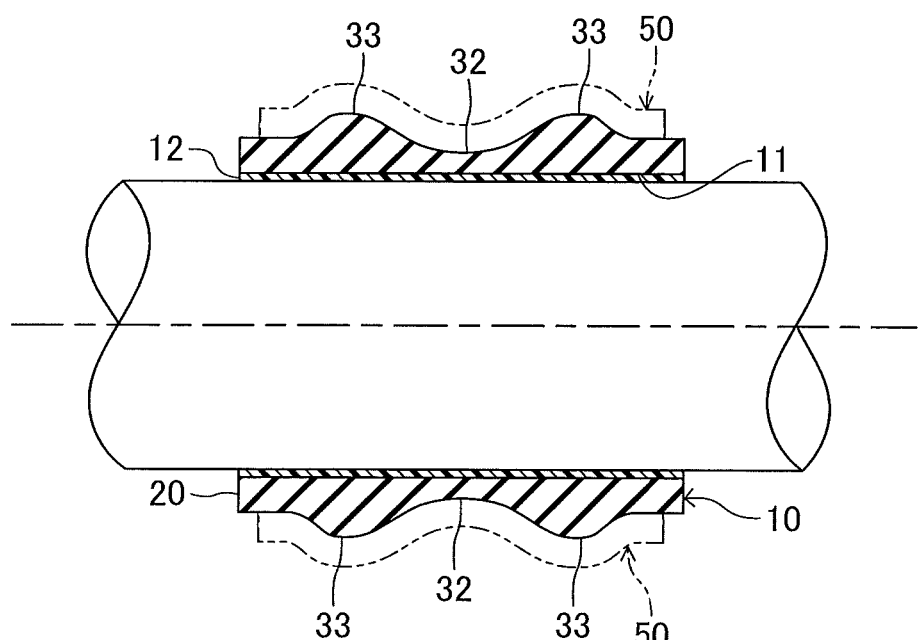
FIG. 6 is a cross sectional view of the bush according to the embodiment along the horizontal plane including the center axis of the through hole where the bracket is not mounted and the bush is not compressed.

The fastening margin is provided in the bush 10 only in the vehicle vertical direction and no fastening margin is provided in the bush 10 in the vehicle longitudinal direction. In other words, the fastening margin is zero (or substantially zero) in the vehicle longitudinal direction between the respective side surface of the bush 10 and the respective parallel plate part 80 of the bracket 50. FIG. 6 is a cross sectional view similar to the cross sectional view of FIG. 3 and shows the non-compressed bush 10 where the bracket 50 is not installed and is illustrated by imaginary lines. The fastening margin of the bush 10 is zero in the vehicle longitudinal direction. Thus, the cross section shape (the shape of side surface) of the bush 10 shown in FIG. 6 is the same as the cross section shape (the shape of the side surface) of the bush 10 shown in FIG. 3.

The stabilizer 100 reduces the roll angle by using the torsion reaction force of the stabilizer bar 101 when the right and left wheels stroke in an invert phase such as during cornering travelling of the vehicle. Therefore, in the stabilizer bar support device 1, it is necessary to keep the rotation of the stabilizer bar 101 about the axis of the stabilizer bar 101 smooth. This is because when the rotation of the stabilizer bar 101 about the axis of the stabilizer bar 101 is not kept smooth, the suspension is unlikely to stroke in the vertical direction and thus, the handling stability and comfortability of the ride of the vehicle may be decreased.

When the fastening margin of the bush 10 is decreased in consideration of that problem, the stabilizer bar 101 easily slides on the inner peripheral surface defining the through hole 11 of the bush 10. Thus, the stabilizer bar 101 can be easily rotated smoothly. However, in that case, when load acts on the stabilizer bar 101 vertically, the opening is easily generated at the axial ends of the bush 10.

The aforementioned configuration of the stabilizer bar support device 1 according to the embodiment can solve that problem. Below, the function of and the effect derived from the stabilizer bar support device 1 will be described.

1. The surfaces of the bush 10 and the bracket 50 which abut against each other has a saddle-like shape (a shape formed by the valley-like part and the mountain-like parts provided at the either sides of the valley-like part). Thereby, the bracket 50 can hold the either ends of the bush 10 and the rubber material which forms the bush 10 can be prevented from axially protruding out from the bracket 50. Therefore, the opening is unlikely to be generated.

2. The partition fittings 13 and 14 are embedded in the bush 10 at the upper and lower positions of the through hole 11, respectively. The partition fitting 13 is positioned so as to reduce the thickness of the rubber material provided between the partition fitting 13 and the through hole 11. The partition fitting 14 is positioned so as to reduce the thickness of the rubber material provided between the partition fitting 14 and the through hole 11. Thereby, even when the vertical relationship in position between the either ends of the stabilizer bar 101 varies and the stabilizer bar 101 is inclined in the vehicle vertical direction, the vertical resilient deformation of the rubber material provided between the through hole 11 and the respective partition fittings 13 and 14 is suppressed. Thus, the partition fittings 13 and 14 also move in accordance with the movement of the stabilizer bar 101. As a result, the opening is unlikely to be generated.

3. The fastening margin of the axial center part (the bush valley-like part 32) of the pressed part 30 of the bush 10 is relatively small and the fastening margin of the respective axial end part (the respective mountain-like bush part 33) provided at the respective side of the center part is relatively large. Thereby, when the stabilizer bar 101 slides on the inner peripheral surface defining the through hole 11, the sliding friction force can be reduced at the axial center part of the through hole 11 of the bush 10. Further, the fastening margin of the mountain-like bush part 33 is larger than the fastening margin of the bush valley-like part 32. Thus, the bracket 50 can assuredly hold the either ends of the bush 10 and the opening is unlikely to be generated. Therefore, the sliding friction force can be totally reduced between the outer peripheral surface of the stabilizer bar 101 and the inner peripheral surface defining the through hole 11 by setting the fastening margin of the respective axial end of the bush 10 (the respective mountain-like bush part 33) to fastening margin such that the opening is prevented from being generated and by setting the fastening margin of the center part of the bush 10 (the bush valley-like part 32) to fastening margin smaller than the fastening margin of the respective axial end of the bush 10. Thereby, the stabilizer bar 101 can slide smoothly with respect to the bush 10. Thus, the handling stability and comfortability of the ride of the vehicle may be improved. Further, a larger fastening margin is provided in the bush 10 having a larger thickness. Thus, the bush 10 can be compressively deformed appropriately.

4. The fastening margin of the bush 10 is zero in the vehicle longitudinal direction. Thereby, the sliding friction force can be further reduced between the outer peripheral surface of the stabilizer bar 101 and the inner peripheral surface defining the through hole 11. Further, no large load does not act on the stabilizer bar 101 in the vehicle longitudinal direction. Therefore, even if the fastening margin of the bush 10 is zero in the vehicle longitudinal direction, the opening is unlikely to be generated. Further, the stabilizer bar support device 1 fastens the bracket 50 to the vehicle body member B in the vehicle upward or downward direction to support the stabilizer bar 101. Thus, when a large load acts on the stabilizer bar 101 in the vehicle vertical direction, the opening is prevented from being generated. Further, when the bracket 50 is temporarily mounted on the bush 10, the bush 10 can be easily inserted into the space defined by the U-shaped band part 60 of the bracket 50 without compressively deforming the bush 10 by sliding the respective inner surfaces of the parallel plate parts 80 of the bracket 50 on the respective side surfaces of the base part 20 of the bush 10.

5. The liner cloth 12 is provided on the inner peripheral surface defining the through hole 11 of the bush 10. Thus, the friction coefficient of the sliding surface of the inner peripheral surface defining the through hole 11 on which the stabilizer bar 101 slides can be reduced. Therefore, the stabilizer bar 101 can slide smoothly with respect to the bush 10. Thus, the handling stability and comfortability of the ride of the vehicle may be improved.

The embodiment of the stabilizer bar support device according to the invention has been described. However, the invention is not limited to the embodiment described above. Various modifications can be employed without departing from the object of the invention.

For example, in the embodiment described above, the surfaces of the bush 10 and the bracket 50 which abut against each other have saddle-like shapes, respectively. However, the surfaces of the bush 10 and the bracket 50 may not have saddle-like shapes, respectively. Further, the liner cloth 12 may be omitted or the partition fittings 13 and 14 may be omitted.

What is claimed is:

1. A stabilizer bar support device for resiliently supporting a stabilizer bar of a vehicle on a vehicle body member of the vehicle, comprising:
   a bush made of elastic material, the bush having a through hole, into which the stabilizer bar is inserted; and
   a bracket made of metal, the bracket having,
      a U-shaped body part for receiving the bush,
      a first fastened part extending from one end of the body part, the first fastened part being fastened to the vehicle body member, and
      a second fastened part extending from the other end of the body part, the second fastened part being fastened to the vehicle body member,
   wherein the bush can be compressively deformed by being pressed by the body part of the bracket toward the vehicle body member when the first and second fastened parts are fastened to the vehicle body member,
   wherein an amount of compressive deformation of a center part of the bush in an axial direction of the through hole is smaller than an amount of compressive deformation of an end part of the bush in the axial direction of the through hole,
   wherein the center part of the bush to be pressed by the inner peripheral surface of the body part of the bracket has a valley-like shape recessed toward the vehicle body part of the bracket has a mountain-like shape elevated away from the vehicle body member,
   wherein the body pan of the bracket has a valley-like part recessed away from the vehicle body member and a mountain-like part elevated toward the vehicle body member, the valley-like part of the body part of the bracket being able to press the valley-like part of the bush while tightly contacting the valley-like part of the bush, the mountain-like part of the body part of the bracket being able to press the mountain-like part of the bush while tightly containing the mountain-like part of the bush, and
   wherein the space of the part of the bush to be pressed by the inner peripheral surface of the body part of the bracket and the shape of the part of the body part of the bracket which presses the bush are configured such that the amount of the compressive deformation of the bush gradually increases from the valley-like part of the bush toward the top of the mountain-like part of the bush in the axial direction of the through hole and the amount of the compressive deformation of the bush gradually decreases from the top of the mountain like part of the bush toward the end part of the bush in the axial direction of the through hole.

2. The stabilizer bar support device according to claim 1, wherein when the bush is pressed by the inner peripheral surface of the body part of the bracket, the bush is configured such that the bush is able to be compressively deformed in a vertical direction with respect to the vehicle and is not able to be compressively deformed in a longitudinal direction with respect to the vehicle.

* * * * *